(12) United States Patent
Jun

(10) Patent No.: US 9,870,693 B2
(45) Date of Patent: Jan. 16, 2018

(54) METHOD FOR PREVENTING PORTABLE ELECTRONIC DEVICE FROM BEING LEFT IN VEHICLE, THE PORTABLE ELECTRONIC DEVICE, AND THE VEHICLE

(71) Applicant: Samsung Electronics Co., Ltd., Gyeonggi-do (KR)

(72) Inventor: Hee-June Jun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/136,356

(22) Filed: Apr. 22, 2016

(65) Prior Publication Data

US 2016/0314682 A1 Oct. 27, 2016

(30) Foreign Application Priority Data

Apr. 22, 2015 (KR) .................. 10-2015-0056665

(51) Int. Cl.
*G08B 21/24* (2006.01)
*H04W 4/02* (2009.01)

(52) U.S. Cl.
CPC ............ *G08B 21/24* (2013.01); *H04W 4/027* (2013.01)

(58) Field of Classification Search
CPC ...... G08B 21/24; G08B 21/02; G08B 25/009; G08B 21/0202; H04W 4/027; B60N 2/002; B60N 2/28; B60N 2002/2815; B60N 2/26
See application file for complete search history.

(56) References Cited

U.S. PATENT DOCUMENTS

2003/0222775 A1* 12/2003 Rackham ............ B60R 25/1004
340/457
2013/0257604 A1* 10/2013 Mirle ...................... B60R 16/02
340/425.5
2015/0262465 A1*  9/2015 Pritchett ................ G08B 21/24
340/686.6

FOREIGN PATENT DOCUMENTS

JP         2011-247076         12/2011
KR      10-2014-0067688         6/2014

* cited by examiner

*Primary Examiner* — Kabir A Timory
(74) *Attorney, Agent, or Firm* — The Farrell Law Firm, P.C.

(57) ABSTRACT

A method for preventing a portable electronic device from being left in a vehicle, and the electronic device and the vehicle using the same is provided. The method of the electronic device includes receiving, from the vehicle, a first signal including information regarding identification of an off state of an engine of the vehicle, receiving, from the vehicle, a second signal including information regarding identification of a change to an empty state of at least one seat of the vehicle, determining movement of the electronic device, and executing an alarm function, based on at least one of the first signal, the second signal, and the determined movement of the electronic device.

15 Claims, 7 Drawing Sheets

METHOD FOR PREVENTING PORTABLE ELECTRONIC DEVICE FROM BEING LEFT IN VEHICLE, THE PORTABLE ELECTRONIC DEVICE, AND THE VEHICLE

PRIORITY

This application claims priority under 35 U.S.C. §119(a) of a Korean Patent Application filed in the Korean Intellectual Property Office on Apr. 22, 2015, and assigned Serial No. 10-2015-0056665, the entire disclosure of which is incorporated herein by reference.

BACKGROUND

1. Field of the Disclosure

The present disclosure relates generally to a method for preventing a portable electronic device from being left in a vehicle.

2. Description of the Related Art

A variety of features to help make people's lives more convenient, such as a schedule management feature, a map feature, and an Internet banking feature, may be applied to portable electronic devices, such as smart phones, tablet personal computers (PCs), or personal digital assistants (PDAs). Further, a portable electronic device may be connected to an in-vehicle infotainment (IVI) system of a vehicle to provide audio signals of the portable electronic device to the IVI system. In this way, the portable electronic device may provide a variety of features in association with the vehicle.

Users of portable electronic devices may occasionally get out of their vehicles while leaving the portable electronic devices in their vehicles. In this case, a user may be forced to go back to his/her vehicle to pick up the portable electronic device, or to spend time without the portable electronic device.

Accordingly, a method is needed to prevent users from leaving their portable electronic devices in their vehicles.

SUMMARY

The present disclosure has been made to address at least the above-mentioned problems and/or disadvantages and to provide at least the advantages described below.

Accordingly, an aspect of the present disclosure is to provide a method for preventing a portable electronic device from being left in a vehicle by informing the user when the portable electronic device is left in the vehicle, the portable electronic device, and the vehicle.

In accordance with an aspect of the present disclosure, a method of an electronic device for preventing the electronic device from being left in a vehicle is provided. The method includes receiving, from the vehicle, a first signal including information regarding identification of an off state of an engine of the vehicle, receiving, from the vehicle, a second signal including information regarding identification of a change to an empty state of at least one seat of the vehicle, determining movement of the electronic device, and executing an alarm function, based on at least one of the first signal, the second signal, and the determined movement of the electronic device.

In accordance with another aspect of the present disclosure, a method of a vehicle for preventing an electronic device from being left in the vehicle is provided. The method includes identifying an off state of an engine of the vehicle, transmitting, to the electronic device, a first signal including information regarding the identification of the off state of the engine, identifying a change in state of at least one seat in the vehicle, and transmitting, to the electronic device, a second signal including information regarding the identification of the change in the state of the seat.

In accordance with another aspect of the present disclosure, an electronic device is provided. The electronic device includes a communication module, a sensor module that detects movement of the electronic device; and a controller. The controller receives, from the vehicle, through the communication module, a first signal including information regarding detection of an off state of an engine a vehicle, receives, from the vehicle, through the communication module, a second signal including information regarding detection of a change in state of at least one seat of the vehicle, determines movement of the electronic device for a specified time, using the sensor module, and controls to output an alarm, based on the determined movement of the electronic device.

In accordance with another aspect of the present disclosure, a vehicle is provided. The vehicle includes a communication unit, an engine switch unit that turns an engine of the vehicle on or off; a seat occupancy detection unit that detects a person sitting in at least one seat of the vehicle; and a controller. The controller that controls to, upon detecting an off state of the engine through the engine switch unit, transmit, to an electronic device connected through the communication unit, a first signal including information regarding the off state of the engine, and upon detecting a change in state of at least one seat of the vehicle through the seat occupancy detection unit, transmit, to the electronic device, a second signal including information regarding the change in the state of the at least one seat.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION OF EMBODIMENTS OF THE PRESENT DISCLOSURE

Figure 1:
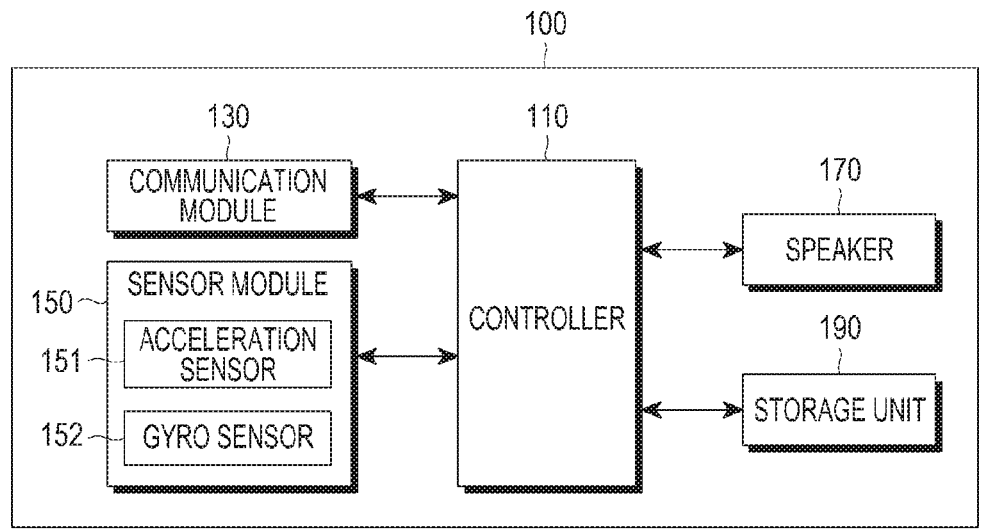
FIG. 1 is a block diagram of a configuration of a portable electronic device, according to an embodiment of the present disclosure.

Hereinafter, embodiments of the present disclosure will be disclosed with reference to the accompanying drawings. However, the embodiments described herein are not intended to limit the present disclosure to particular embodiments, and the present disclosure should be construed as including various modifications, equivalents, and/or alternatives according to the embodiments of the present disclosure. In regard to the description of the drawings, like reference numerals refer to like elements.

In the present disclosure, expressions such as "having," "may have," "comprising," and "may comprise" indicate the existence of a corresponding characteristic (such as a numerical value, function, operation, or component) and do not exclude the existence of additional characteristic.

In the present disclosure, expressions such as "A or B," "at least one of A or/and B," and "one or more of A or/and B" may include all possible combinations of items listed together. For example, "A or B," "at least one of A and B," and "one or more of A or B" may indicate (1) including A, (2) including B, or (3) including both A and B.

Expressions such as "first," "second," "primarily," or "secondary," used herein may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is operatively or communicatively "coupled" to or "connected" to another element (such as a second element), the first element can be directly connected to the second element or can be connected to the second element through a third element. However, when it is described that an element (such as a first element) is "directly connected" or "directly coupled" to another element (such as a second element), it means that there is no intermediate element (such as a third element) between the first element and the second element.

The expression "configured to (or set)", used in the present disclosure, may be used interchangeably with, for example, "suitable for," "having the capacity to," "designed to," "adapted to," "made to," or "capable of" according to the situation. The term "configured to (or set)" does not always mean only "specifically designed to" by hardware. Alternatively, in some situations, the expression "apparatus configured to" may mean that the apparatus "can" operate together with another apparatus or component. For example, the phrase "a processor configured (or set) to perform A, B, and C" may refer to a generic-purpose processor (such as a CPU or an application processor) that can perform a corresponding operation by executing at least one software program stored at an exclusive processor (such as an embedded processor) for performing a corresponding operation or at a memory device.

Terms defined in the present disclosure are used only for describing a specific embodiment and are not intended to limit the scope of other embodiments. When a singular form is used herein, it should be understood to include plural forms as well, unless the context dictates otherwise. All terms, including technical and scientific terms, used herein, have the same meaning as commonly understood by a person of ordinary skill in the art. Additionally, terms defined in general dictionaries should be interpreted to have meanings consistent with their meanings in the context of the related technology and are not to be interpreted in an ideal or excessively formal manner unless explicitly so defined. In some cases, terms defined in the present disclosure should not be interpreted to exclude the embodiments of the present disclosure.

An electronic device according to various embodiments of the present disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., smart glasses, a head mounted device (HMD), electronic clothing, electronic bracelet, electronic necklace, electronic appcessory, electronic tattoo, smart mirror or smart watch).

In some embodiments of the present disclosure, the electronic device may be a smart home appliance. The smart home appliance may include at least one of, a television (TV), a digital versatile disk (DVD) player, an audio player, a refrigerator, an air conditioner, a cleaner, an oven, a microwave oven, a washer, an air purifier, a set-top box, a home automation control panel, a security control panel, a TV box (e.g., a Samsung HomeSync™, an Apple TV™, or a Google TV™), a game console (e.g., Xbox™ or PlayStation™), an electronic dictionary, an electronic key, a camcorder or a digital photo frame.

In another embodiment of the present disclosure, the electronic device may include at least one of various medical devices (e.g., various portable medical meters (e.g., a blood glucose meter, a heart rate meter, a blood pressure meter, a temperature meter or the like), magnetic resonance angiography (MRA), magnetic resonance imaging (MRI), computed tomography (CT), a medical camcorder, an ultrasonic device, etc.), a navigation device, a global positioning system (GPS) receiver, an event data recorder (EDR), a flight data recorder (FDR), an automotive infotainment device, a marine electronic device (e.g., a marine navigation device, a gyro compass, etc.), avionics, a security device, a car head unit, an industrial or household robot, an automatic teller machine (ATM), point of sales (POS) terminals, or an Internet of Things (IoT) device (e.g., an electric light bulb, various sensors, an electricity or gas meter, a sprinkler device, a fire alarm, a thermostat, a streetlamp, a toaster, fitness equipment, a hot water tank, a heater, a boiler, etc.).

In some embodiments of the present disclosure, the electronic device may include at least one of a part of the furniture or building/structure, an electronic board, an electronic signature receiving device, a projector, or various meters (e.g., meters for water, electricity, gas or radio waves).

In various embodiments of the present disclosure, the electronic device may be one or a combination of the above-described devices.

An electronic device according to some embodiments of the present disclosure may be a flexible electronic device.

Further, an electronic device according to an embodiment of the present disclosure is not be limited to the above-described devices, and may include a new electronic device based on the development of technology.

Hereinafter, an electronic device according to various embodiments of the present disclosure will be described with reference to the accompanying drawings. As used herein, the term 'user' may refer to a person who uses the electronic device, or a device (e.g., an artificial intelligence electronic device) that uses the electronic device.

FIG. 1 is a block diagram of a configuration of a portable electronic device, according to an embodiment of the present disclosure.

Referring to FIG. 1, an electronic device 100 includes a controller 110, a communication module 130, a sensor module 150, a speaker 170, and a storage unit 190.

The communication module 130 performs a wireless signal processing operation for wireless communication with an external device, such as a server and a mobile communication terminal, and includes an antenna, a radio frequency (RF) unit, and a modem. Further, the communication module 130 may include short-range communication modules, such as a wireless local area network (WLAN) module, a Wi-Fi Direct module, a near field communication (NFC) module, and a Bluetooth (BT) module, to access the wireless Internet in the place where a wireless access point (AP) is installed, or to perform a wireless short-range communication operation with peripheral devices.

Figure 2:
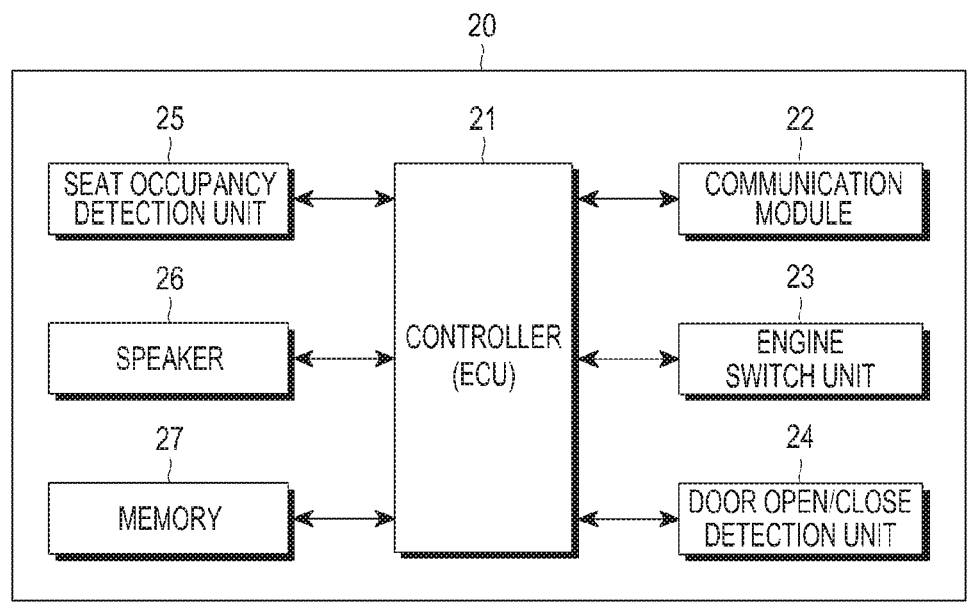
FIG. 2 is a block diagram of a configuration of a vehicle, according to an embodiment of the present disclosure.

The communication module 130 performs wireless communication with a communication unit in a vehicle 20 (shown in FIG. 2)

The sensor module 150 detects movement of the electronic device 100. The sensor module 150 includes an acceleration sensor 151 and a gyro sensor 152.

The acceleration sensor 151 measures an acceleration value of the electronic device 100.

The gyro sensor 152 measures a rotation angle value of the electronic device 100.

The sensor module 150 may further include various other components capable of detecting movement of the electronic device 100.

The storage unit 190, under control of the controller 110, stores the signals or data that are input and output in response to operations of the communication module 130, the sensor module 150, and the speaker 170. Further, the storage unit 190 stores a control program and applications for control of the electronic device 100 or the controller 110.

The term "storage unit" may refer to the storage unit 190, a read only memory (ROM) or random access memory (RAM) in the controller 110, or a memory card (e.g., a secure digital (SD) card and a memory stick) mounted in the electronic device 100.

The storage unit 190 stores a specified alarm (e.g., music, a beep, and the like) that is output through the speaker 170, according to an embodiment of the present disclosure.

The controller 110 collectively controls the above components (e.g., the communication module 130, the sensor module 150, the speaker 170 and the storage unit 190).

According to an embodiment of the present disclosure, the controller 110 controls to receive a first signal including information regarding detection of an engine off state of the vehicle 20 from the vehicle 20 connected through the communication module 130. Further, the controller 110 controls to receive a second signal including information regarding detection of a change in state of at least one seat in the vehicle 20 from the vehicle 20. For example, the detection of a change in state of at least one seat may be a detection of a change to an empty state of at least one seat in which a person has been sitting in the vehicle 20. Upon receiving the first signal and the second signal, the controller 110 determines movement/non-movement of the electronic device 100 for a specified time using the sensor module 150, and controls to output a specified alarm in the storage unit 190 through the speaker 170 or to transmit a third signal to execute an alarm function to the vehicle 20, depending on the determined movement/non-movement of the electronic device 100. For example, if there is no movement of the electronic device 100 for a specified time, the controller 110 controls to output a specified alarm in the storage unit 190 through the speaker 170 or to transmit a third signal to execute an alarm function to the vehicle 20.

The first signal may further include information regarding detection of an open state of at least one door of the vehicle 20. The second signal may further include information regarding detection of a close state of the door whose open state was previously detected.

According to an embodiment of the present disclosure, the controller 110 identifies a first acceleration value of the electronic device 100 using the acceleration sensor 151 upon receiving the first signal. The controller 110 identifies the presence/absence of a change in the first acceleration value upon receiving the second signal, and determines that there is no movement of the electronic device 100, if a variation in the identified acceleration value is below a predetermined level (e.g., a specified reference value). For example, the controller 110 identifies a second acceleration value of the electronic device 100 upon receiving the second signal, and compares the second acceleration value with the first acceleration value that was identified upon reception of the first signal, to determine whether the second acceleration value has changed from the first acceleration value. Accordingly, if it is determined that a variation in the acceleration value is below a predetermined level, the controller 110 determines that there is no movement of the electronic device 100.

According to an embodiment of the present disclosure, the controller 110 identifies a first rotation angle value of the electronic device 100 using the gyro sensor 152 upon receiving the first signal. The controller 110 identifies the presence/absence of a change in the first rotation angle value upon receiving the second signal, and determines that there is no movement of the electronic device 100, if a variation in the first rotation angle value is below a predetermined level (e.g., a specified reference value). For example, the controller 110 identifies a second rotation angle value of the electronic device 100 upon receiving the second signal, and compares the second rotation angle value with the first rotation angle value that was identified upon reception of the first signal, to determine whether the second rotation angle value has changed from the first rotation angle value. Accordingly, if a variation in the rotation angle is below a predetermined level, the controller 110 determines that there is no movement of the electronic device 100.

The detection of a change to an empty state of at least one seat in which a person has been sitting in the vehicle 20 may be performed by identifying a change in pressure value of a pressure sensor in the seat by the vehicle 20.

The at least one seat includes a driver's seat of the vehicle 20, and the at least one door includes a driver's door.

FIG. 2 is a block diagram of a configuration of a vehicle, according to an embodiment of the present disclosure.

Referring to FIG. 2, a vehicle 20 includes a controller (or an electronic control unit (ECU)) 21, a communication unit 22, an engine switch unit 23, a door open/close detection unit 24, a seat occupancy detection unit 25, a speaker 26 and a memory 27.

The communication unit 22 may include all or some components of the communication module 130 in the electronic device 100.

The engine switch unit 23 turns the engine of the vehicle 20 on or off, according to the user's manipulation and/or under control of the controller 21. The engine switch unit 23 may include a button-type engine switch, and the user may turn the engine on or off by pressing the button-type engine switch.

The door open/close detection unit 24 detects an open/close state of a door of the vehicle 20. The door open/close detection unit 24 may include at least one sensor for detecting the open/close state of the door, and the sensor for detecting the open/close state of the door may be provided in at least one door of the vehicle 20.

The seat occupancy detection unit 25 detects a person sitting in at least one seat of the vehicle 20. The seat occupancy detection unit 25 may include a pressure sensor. The pressure sensor may be provided in at least one seat of the vehicle 20, and measures a pressure value. In addition, the seat occupancy detection unit 25 may include a variety of components such as a camera module capable of detecting a person sitting in the seat.

The memory 27, under control of the controller 21, stores the signals or data that are input and output in response to operations of the communication unit 22, the engine switch unit 23, the door open/close detection unit 24, the seat occupancy detection unit 25, and the speaker 26. Further, the memory 27 stores a control program and applications for control of the vehicle 20 or the controller 21.

The memory 27 stores a specified alarm (e.g., music, beep, etc.) that is output through the speaker 26, according to an embodiment of the present disclosure.

The controller 21 collectively controls the above components (e.g., the communication unit 22, the engine switch unit 23, the door open/close detection unit 24, the seat occupancy detection unit 25 and the speaker 26).

According to an embodiment of the present disclosure, the controller 21, upon detecting an engine off state, controls to transmit, through the engine switch unit 23, a first signal including information regarding the engine off state to the electronic device 100 connected through the communication unit 22.

Further, the controller 21, upon detecting a change in the state of at least one seat in the vehicle 20 based on an output value regarding detection by the seat occupancy detection unit 25, controls to transmit a second signal including information regarding a change in the state of the seat to the electronic device 100. For example, the detection of a change in the state of at least one seat in the vehicle 20 may be a detection of a change to an empty state of at least one seat in which a person has been sitting in the vehicle 20.

According to an embodiment of the present disclosure, the controller 21 controls to detect the open state of at least one door of the vehicle 20, through the door open/close detection unit 24, and to detect the close state of the door whose open state was previously detected, through the door open/close detection unit 24.

The first signal may further include information regarding detection of the open state of a door of the vehicle 20, and the second signal may further include information regarding detection of the close state of the door whose open state was previously detected.

The controller 21 determines that a state of the seat is changed to an empty state, based on a change in a pressure value of the seat, which is identified through the pressure sensor.

The controller 21 outputs a specified alarm in the memory 27 through the speaker 26, upon receiving a third signal to execute an alarm function from the electronic device 100.

The controller 21 controls to blink the headlights of the vehicle 20 a predetermined number of times, upon receiving a third signal to execute an alarm function from the electronic device 100.

The controller 21 controls to, upon receiving a third signal to execute an alarm function from the electronic device 100, blink the headlights of the vehicle 20 a predetermined number of times while outputting a specified alarm through the speaker 26.

Figure 3:
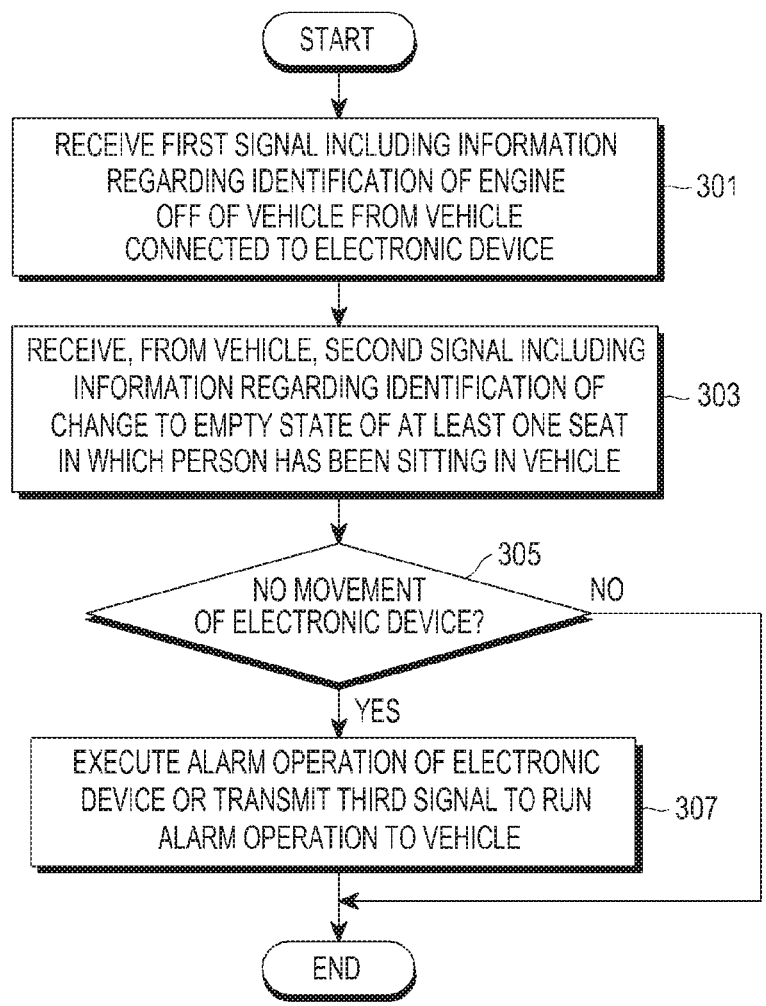
FIG. 3 is a flowchart of a method for preventing a portable electronic device from being left in a vehicle, according to an embodiment of the present disclosure.

FIG. 3 is a flowchart of a method for preventing a portable electronic device from being left in a vehicle, according to various embodiments of the present disclosure.

Referring to FIG. 3, when a person who has been sitting in the vehicle 20 gets out of the vehicle 20, leaving the electronic device 100 connected to the vehicle 20 in the vehicle 20, the electronic device 100 receives, from the vehicle 20, information indicating that the engine of the vehicle 20 is turned off and a state of at least one seat of the vehicle 20 is changed to an empty state, identifies that there is no movement of the electronic device 100, and executes an alarm function of the electronic device 100.

The electronic device 100 and the vehicle 20 may be connected to each other through Bluetooth communication, Wi-Fi communication, or universal serial bus (USB) communication.

The electronic device 100 and the vehicle 20 may be connected to each other based on a user's manipulation. For example, the electronic device 100 and the vehicle 20 may be connected to communicate with each other by setting the vehicle 20 as a device to perform Bluetooth communication with the electronic device 100 by running the Bluetooth function of the electronic device 100 based on the user's manipulation.

Alternatively, the electronic device 100 and the vehicle 20 may be automatically connected to each other. For example, in a case where the vehicle 20 has ever been set as a device to perform Bluetooth communication with the electronic device 100 and the electronic device 100 is located within a distance where the electronic device 100 can perform Bluetooth communication with the vehicle 20, the electronic device 100 and the vehicle 20 may be automatically connected to communicate with each other, under control of the controller 110.

In step 301, the electronic device 100 receives a first signal including information regarding identification of an off state of the engine of the vehicle 20 from the vehicle 20 connected to the electronic device 100.

In step 303, the electronic device 100 receives, from the vehicle 20, a second signal including information regarding identification of a change to an empty state of at least one seat in which a person has been sitting in the vehicle 20.

Upon receiving the first signal and the second signal, the electronic device 100 determines in step 305 whether there is no movement of the electronic device 100 for a specified time. The movement/non-movement of the electronic device 100 may be identified by a sensor module to detect movement of the electronic device 100.

According to an embodiment of the present disclosure, the electronic device 100 may determine the movement/non-movement of the electronic device 100 based on the presence/absence of a change in an acceleration value of the electronic device 100 for a specified time using the acceleration sensor 151 of the electronic device 100. For example, the electronic device 100 identifies the presence/absence of a change in an acceleration value of the electronic device 100 for a specified time by measuring an acceleration value of the electronic device 100 at a specified first time and measuring an acceleration value of the electronic device 100 at a specified second time. If a variation in the acceleration value is below a predetermined level, the electronic device 100 determines that there is no movement of the electronic device 100.

The electronic device 100 determines the movement/non-movement of the electronic device 100 depending on the presence/absence of a change in rotation angle value of the electronic device 100 for a specified time using the gyro sensor 152 of the electronic device 100. For example, the electronic device 100 identifies the presence/absence of a change in rotation angle value of the electronic device 100 for a specified time by measuring a rotation angle value of the electronic device 100 at a specified first time and measuring a rotation angle value of the electronic device 100 at a specified second time. If a variation in the rotation angle value is below a predetermined level, the electronic device 100 determines that there is no movement of the electronic device 100.

The electronic device 100 may determine the movement/non-movement of the electronic device 100 through each or a combination of operations of the acceleration sensor 151, the gyro sensor 152, and/or various other components (e.g., sensors) provided in the electronic device 100.

If it is determined in step 305 that there is no movement of the electronic device 100, the electronic device 100 executes an alarm function of the electronic device 100 or transmit a third signal to execute an alarm function to the vehicle 20, in step 307. Executing an alarm function of the electronic device 100 includes outputting a specified alarm (e.g., music, beep, etc.) in the storage unit 190 through the speaker 170. Further, when executing the alarm function, the electronic device 100 may increase the volume of the speaker 170 by a specified value and then, output the specified alarm through the speaker 170.

If it is determined in step 305 that there is movement of the electronic device 100, the electronic device 100 ends the operation.

According to an embodiment of the present disclosure, the first signal may further include information regarding identification of an open state of at least one door of the vehicle 20, and the second signal may further include information regarding identification of a close state of the door whose open state was previously identified.

The first time may be a reception time of the first signal, and the second time may be a reception time of the second signal.

For example, upon receiving the first signal, the electronic device 100 identifies an acceleration value of the electronic device 100. As for the movement/non-movement of the electronic device 100, upon receiving the second signal, the electronic device 100 identifies the presence/absence of a change in the acceleration value, and determines that there is no movement of the electronic device 100, if a variation in the acceleration value is below a predetermined level.

For example, upon receiving the first signal, the electronic device 100 identifies a rotation angle value of the electronic device 100. As for the movement/non-movement of the electronic device 100, upon receiving the second signal, the electronic device 100 identifies the presence/absence of a change in the rotation angle value, and determines that there is no movement of the electronic device 100, if a variation in the rotation angle value is below a predetermined level.

According to an embodiment of the present disclosure, the at least one seat includes a driver's seat of the vehicle 20, and the at last one door includes a driver's door.

According to an embodiment of the present disclosure, the vehicle 20 identifies an engine off state of the vehicle 20, and transmits a first signal including information regarding the identification of the engine off state to the electronic device 100 connected to the vehicle 20. Further, the vehicle 20 identifies a change to an empty state of at least one seat in which a person has been sitting in the vehicle 20, and transmits a second signal including information regarding the identification of the change to the empty state of the seat to the electronic device 100. Further, the vehicle 20 receives a third signal to execute an alarm function from the electronic device 100, and executes a preset alarm function upon receipt of the third signal.

According to an embodiment of the present disclosure, the vehicle 20 identifies an open state of at least one door of the vehicle 20, and may also identify a close state of the door whose open state was previously identified. Moreover, the first signal may further include information regarding the identification of the open state of the door, and the second signal may further include information regarding the identification of the close state of the door whose open is identified.

Figure 4:
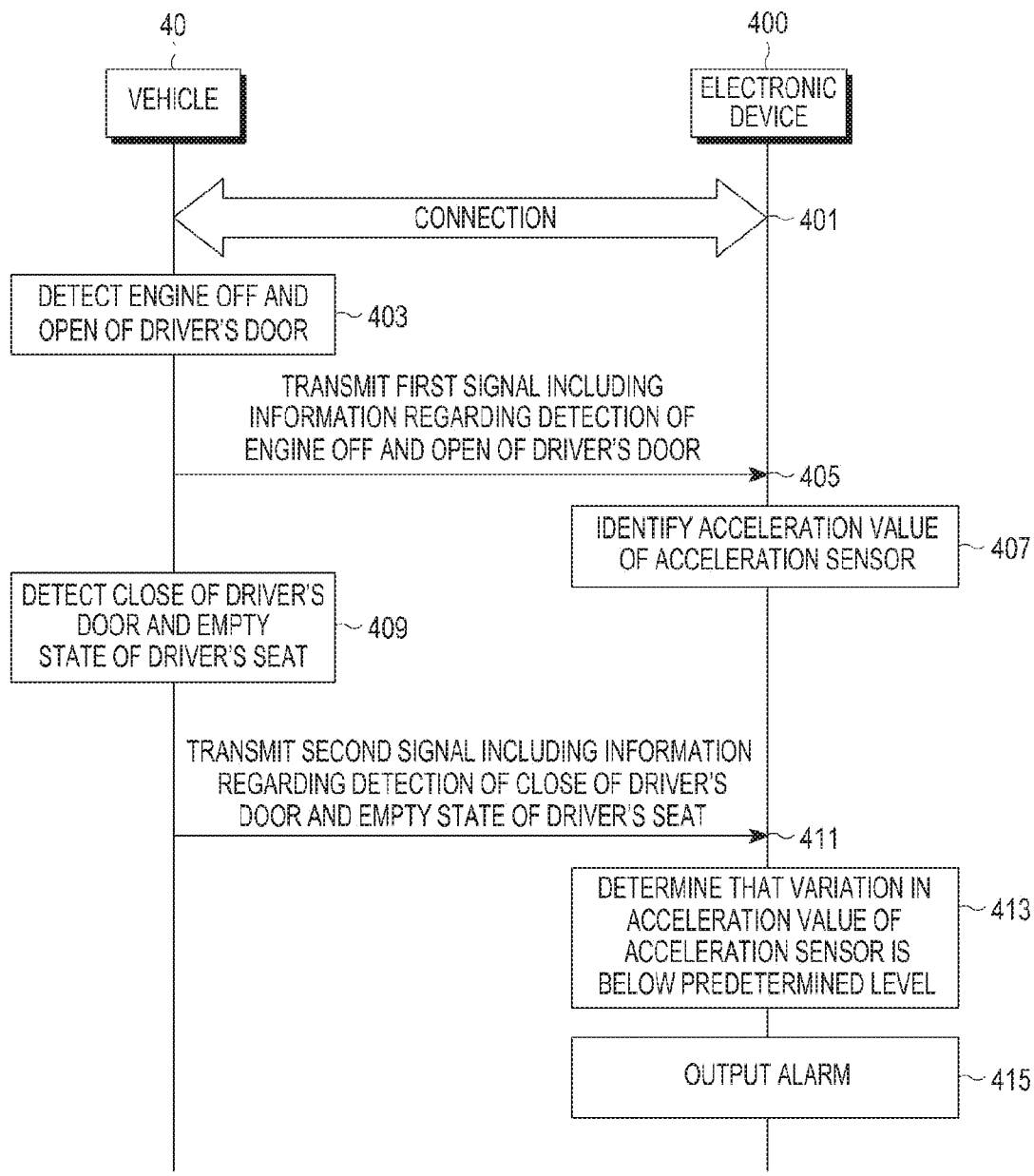
FIGS. 4 and 5 are signal flowcharts of a method for preventing a portable electronic device from being left in a vehicle, according to an embodiment of the present disclosure.
Figure 5:
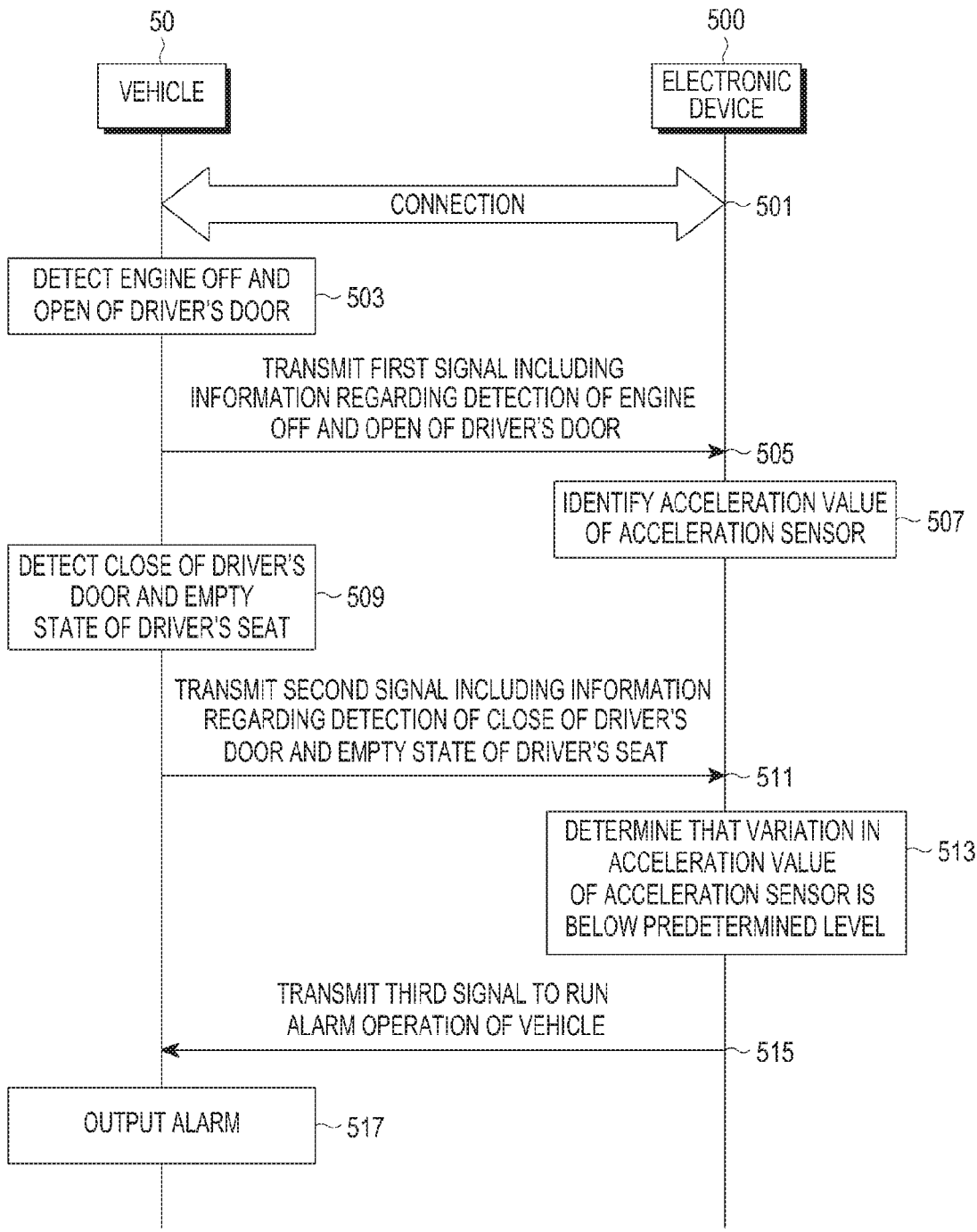

FIGS. 4 and 5 are signal flowcharts of a method for preventing a portable electronic device from being left in a vehicle, according to an embodiment of the present disclosure.

Referring to FIG. 4, when a vehicle driver gets out of a vehicle 40, leaving an electronic device 400 connected to the vehicle 40 in the vehicle 40, the electronic device 400 receives, from the vehicle 40, information about an engine off state and a door open state of the vehicle 40 and information indicating a close state of the open door and a change to an empty state of at least one seat of the vehicle 40, identifies non-movement of the electronic device 400, and executes an alarm function of the electronic device 400.

In step 401, the vehicle 40 and the electronic device 400 may be connected to each other through Bluetooth communication, Wi-Fi communication, or USB communication.

In step 403, the vehicle 40 detects an engine off state and an open state of a driver's door.

In step 405, the vehicle 40 transmits a first signal including information regarding the detection of an engine off state and an open state of the driver's door, to the electronic device 400'.

Upon receiving the first signal, the electronic device 400 identifies a first acceleration value of an acceleration sensor of the electronic device 400 in step 407.

In step 409, the vehicle 40 that has transmitted the first signal detects a close state of the driver's door and an empty state of the driver's seat.

In step 411, the vehicle 40 transmits a second signal including information regarding the detection of a close state of the driver's door and the empty state of the driver's seat.

In step 413, upon receiving the first signal and the second signal, the electronic device 400 identifies the presence/absence of a change in the first acceleration value of the acceleration sensor, which was identified in step 407. For example, in step 413, the electronic device 400 identifies a second acceleration value of the acceleration sensor of the electronic device 400, and compares the second acceleration value with the first acceleration value, which was identified in step 407, to determine whether a variation in the acceleration value is below a predetermined level (e.g., a specified reference value).

Upon determining that the variation in the acceleration value is below the predetermined level, the electronic device 400 outputs an alarm in step 415.

Referring to FIG. 5, when a vehicle driver gets out of a vehicle 50 (leaving an electronic device 500 connected to the vehicle 50 in the vehicle 50, the electronic device 500 receives, from the vehicle 50, information about an engine off state and door open state of the vehicle 50 and information indicating a close state of the open door and a change to an empty state of at least one seat of the vehicle 50, identifies non-movement of the electronic device 500, and executes an alarm function of the electronic device 500.

In step 501, the vehicle 50 and the electronic device 500 may be connected to each other through Bluetooth communication, Wi-Fi communication, or USB communication.

In step 503, the vehicle 50 detects engine off state and an open state of a driver's door.

In step 505, the vehicle 50 transmits a first signal including information regarding the detection of an engine off state and an open state of the driver's door, to the electronic device 500.

Upon receiving the first signal, the electronic device 500 identifies a first acceleration value of an acceleration sensor of the electronic device 500 in step 507.

In step 509, the vehicle 50 that has transmitted the first signal detects a close state of the driver's door and an empty state of the driver's seat.

In step 511, the vehicle 50 transmits a second signal including information regarding the detection of a close state of the driver's door and the empty state of the driver's seat.

In step 513, upon receiving the first signal and the second signal, the electronic device 500 determines that a variation in the first acceleration value of the acceleration sensor, which was identified in step 507, is below a predetermined level.

Upon determining that the variation in the acceleration value is below the predetermined level, the electronic device 500 transmits a third signal to the vehicle 50 to execute an alarm function of the vehicle 50, in step 515.

Upon receiving the third signal, the vehicle 50 outputs an alarm in step 517.

According to the embodiments described with respect to FIGS. 4 and 5, the operation of preventing the portable electronic device from being left in the vehicle has been described with reference to a driver's door and a driver's seat by way of example. However, according to another embodiment, the driver's door may be any one of all the doors of the vehicle, and the driver's seat may be any one of all the seats of the vehicle.

Figure 6:
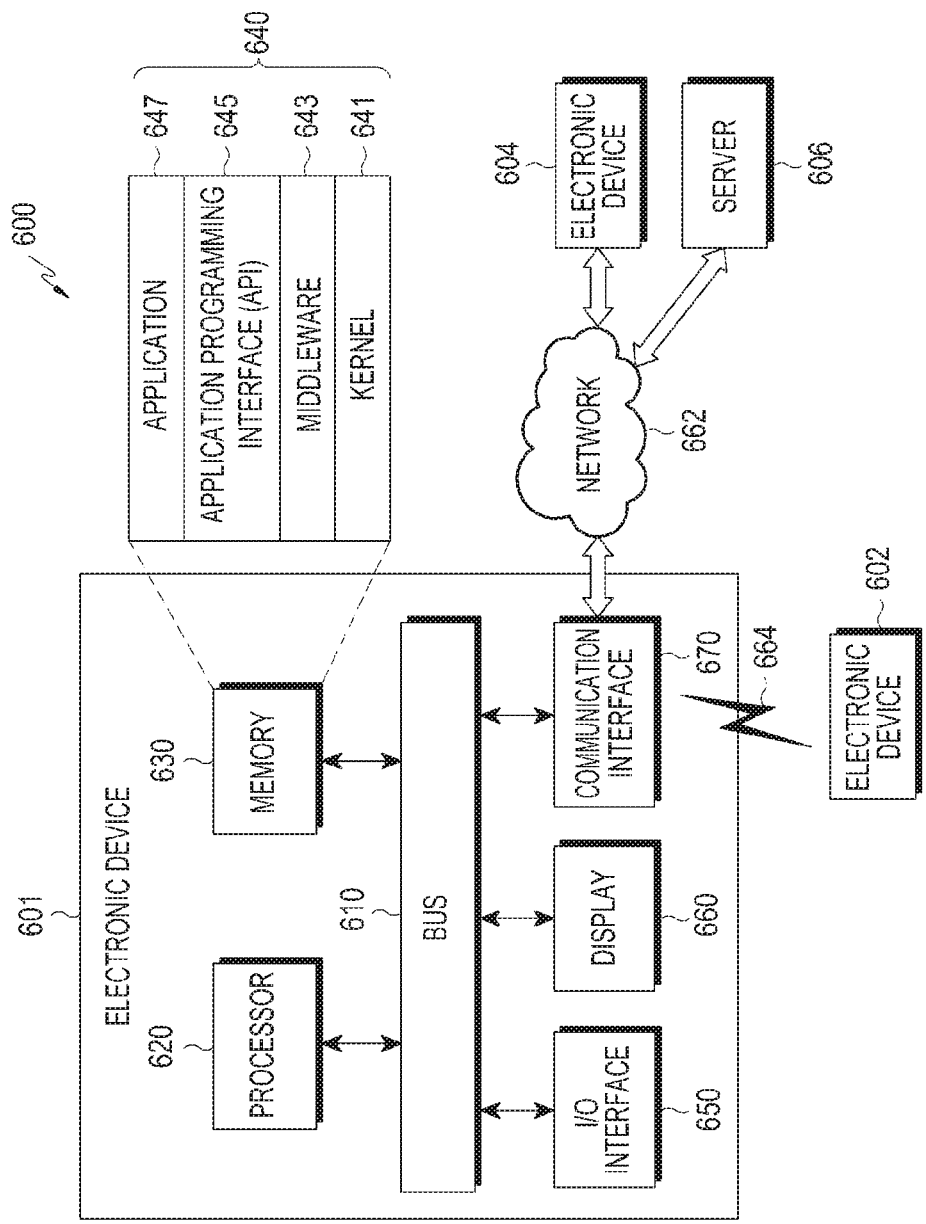
FIG. 6 is a block diagram of a configuration of a network environment, according to an embodiment of the present disclosure.

As is apparent from the foregoing description, an aspect of the present disclosure may provide a method for preventing a portable electronic device from being left in a vehicle. If a user gets out of the vehicle, leaving the portable electronic device in the vehicle, the portable electronic device or the vehicle may inform the user that he/she has left the portable electronic device in the vehicle. For example, if the portable electronic device is still left in the vehicle when the driver (or the user) gets out of the vehicle after turning off the engine and then closes the driver's door, the portable electronic device or the vehicle may inform the driver that the portable electronic device is left in the vehicle, through an alarm function (e.g., an operation of outputting an alarm sound). FIG. 6 is a block diagram of configuration of a network environment, according to an embodiment of the present disclosure.

Referring to FIG. 6, a network environment 600 including an electronic device 601, a first external electronic device 602, a second external electronic device 604, a server 606, and a network 662 is shown.

The electronic device 601 may include the entirety or a part of the electronic device 100 shown in FIG. 1. The electronic device 601 includes a bus 610, a processor 620, a memory 630, an input/output (I/O) interface 650, a display 660, and a communication interface 670. In certain embodiments, the electronic device 601 may omit at least one of the components, or may additional include other components.

The bus 610 is a circuit that connects the components 610 to 670 to each other, and transfers communication (e.g., a control message and/or data) between the components 610 to 670.

The processor 620 may include one or more of a central processing unit (CPU), an application processor (AP) or a communication processor (CP). The processor 620 executes a control and/or communication-related operation or data processing for at least one other component of the electronic device 601. The processor 620 may include the controller 110 in FIG. 1.

The memory 630 may include a volatile and/or non-volatile memory. The memory 630 stores a command or data related to at least one other component of the electronic device 601. The memory 630 may store software and/or a program 640. The program 640 may include a kernel 641, a middleware 643, an application programming interface (API) 645, and/or an application 647. At least some of the kernel 641, the middleware 643, or the API 645 may be referred to as an operating system (OS). The memory 630 may include the storage unit 190 in FIG. 1.

The kernel 641 controls or manages the system resources (e.g., the bus 610, the processor 620, the memory 630, etc.) that are used to execute an operation or function implemented in other programs (e.g., the middleware 643, the API 645, the application program 647, etc.). Further, the kernel 641 may provide an interface by which the middleware 643, the API 645, or the application program 647 can control or manage the system resources by accessing the individual components of the electronic device 601.

The middleware 643 performs an intermediary role so that the API 645 or the application 647 may exchange data with the kernel 641 by communicating with the kernel 641. Further, the middleware 643 may process one or more work requests received from the application 647 according to their priority. For example, the middleware 643 may give a priority for using the system resources (e.g., the bus 610, the processor 620, the memory 630, etc.) of the electronic device 601, to the application 647. For example, the middleware 643 may process the one or more work requests according to the priority given to the application 647, thereby performing scheduling or load balancing for the one or more work requests.

The API 645 is an interface by which the application 647 controls a function provided in the kernel 641 or the middleware 643, and includes at least one interface or function (e.g., an instruction) for file control, window control, image processing, or character control.

The I/O interface 650 transfers a command or data received from a user or an external device, such as the first external electronic device 602, the second external electronic device 604, or the server 606, to the other components of the electronic device 601. Further, the I/O interface 650 outputs a command or data received from the other components of the electronic device 601, to the user or other external devices.

The display 660 may include a liquid crystal display (LCD) display, a light emitting diode (LED) display, an organic light emitting diode (OLED) display, a microelectromechanical systems (MEMS) display, or an electronic paper display. The display 660 displays a variety of content (e.g., texts, images, videos, icons, symbols, etc.), for the user. The display 660 may include a touch screen, and receive a touch input, a gesture input, a proximity input or a hovering input made by an electronic pen or a part of the user's body.

The communication interface 670 establishes communication between the electronic device 601 and the first external electronic device 602, the second external electronic device 604, or the server 606). For example, the communication interface 670 communicates with the second external electronic device 604 or the server 606 by being connected to the network 662 through wireless communication or wired communication.

The wireless communication may include at least one of long term evolution (LTE), long term evolution-advanced (LTE-A), code division multiple access (CDMA), wideband code division multiple access (WCDMA), universal mobile telecommunications system (UMTS), wireless broadband (WiBro), or global system for mobile communications (GSM), as a cellular communication protocol.

The wired communication may include at least one of universal serial bus (USB), high definition multimedia interface (HDMI), recommended standard 232 (RS-232), or plain old telephone service (POTS).

The network 662 may include a telecommunications network, for example, at least one of the computer network (e.g., a local area network (LAN) or a wide area network (WAN)), the Internet, or the telephone network.

The communication interface 670 may include the communication module 130 in FIG. 1.

Each of the first and second external electronic devices 602 and 604 may be identical or non-identical in type to the electronic device 601.

In an embodiment of the present disclosure, the server 606 may include a group of one or more servers.

In an embodiment of the present disclosure, all or some of the operations executed in the electronic device 601 may be executed in one or multiple other electronic devices 602 and 604, or the server 606. For example, if the electronic device 601 should perform a certain function or service automatically or upon request, the electronic device 601 may request at least some of the functions related thereto from the first and second electronic devices 602 and 604 or the server 606, instead of or in addition to independently executing the function or service. In this case, the other electronic devices 602 and 604 or the server 606 may execute the requested function or additional function, and transfer the results to the electronic device 601. The electronic device 601 may process the received results intact or additionally, to provide the requested function or service. To this end, for example, cloud computing, distributed computing, or client-server computing technology may be used.

Figure 7:
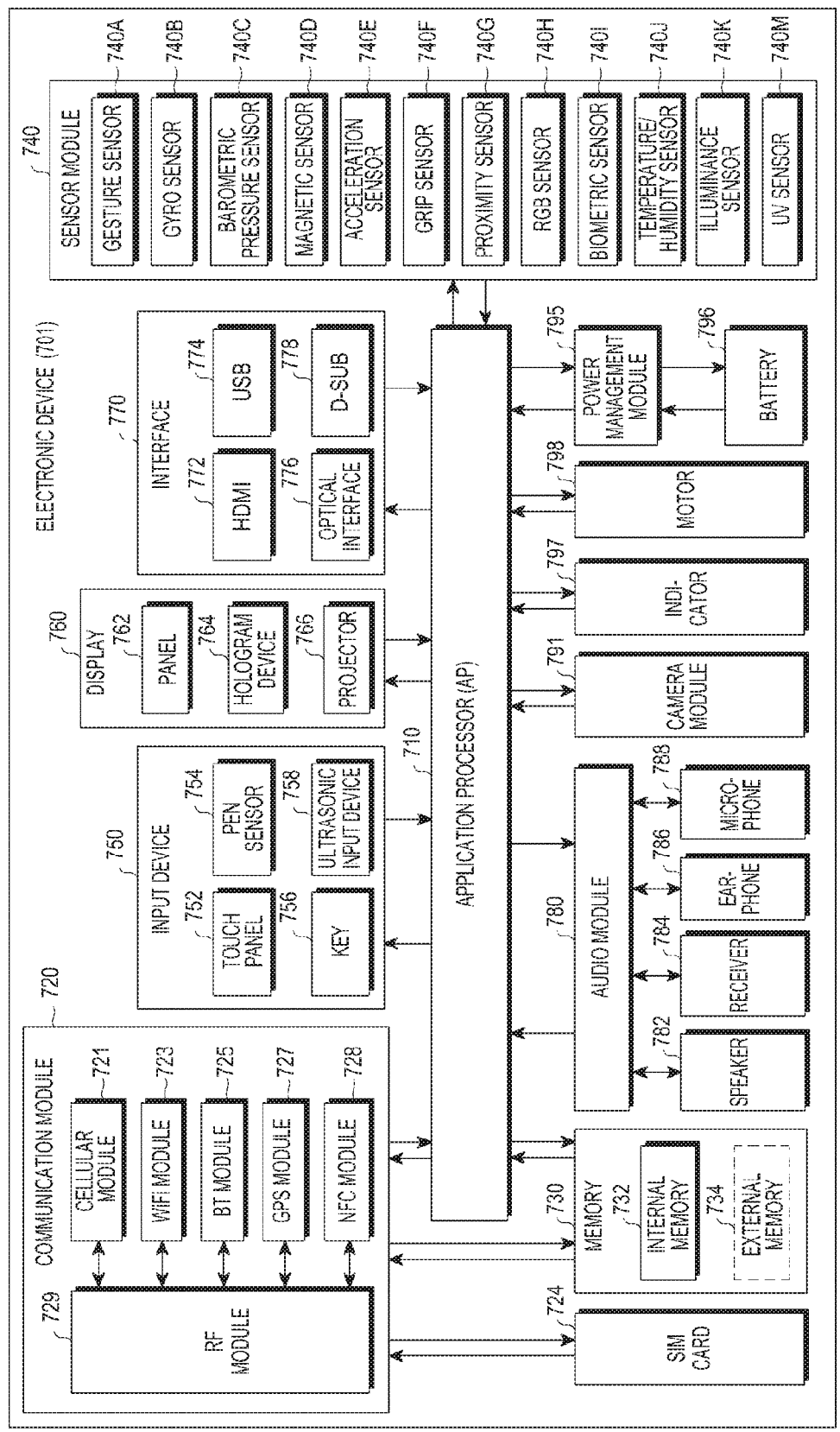
FIG. 7 is a block diagram of a configuration of an electronic device, according to an embodiment of the present disclosure.

FIG. 7 is a block diagram of a configuration of an electronic device, according to an embodiment of the present disclosure.

Referring to FIG. 7, an electronic device 701 may include the entirety or a part of the electronic device 100 shown in FIG. 1. Further, the electronic device 701 may include the entirety or a part of the electronic device 601 shown in FIG. 6.

The electronic device 701 includes at least one application processor (AP) 710, a communication module 720, a subscriber identification module (SIM) card 724, a memory 730, a sensor module 740, an input device 750, a display 760, an interface 770, an audio module 780, a camera module 791, a power management module 795, a battery 796, an indicator 797, and a motor 798.

The AP 710 controls a plurality of hardware or software components connected to the AP 710 by running the operating system or application program, and processes and computes a variety of data. The AP 710 may be implemented in a system on chip (SoC).

In an embodiment of the present disclosure, the AP 710 may further include a graphic processing unit (GPU) and/or an image signal processor.

The AP 710 may include at least some (e.g., a cellular module 721) of the components shown in FIG. 7. The AP 710 loads, in a volatile memory, a command or data received from at least one of the other components (e.g., a non-volatile memory) and processes the loaded data, and stores a variety of data in a non-volatile memory. The AP 710 may include the component of the controller 110 in FIG. 1.

The communication module 720 may be identical or similar in structure to the communication interface 670 in FIG. 6. The communication module 720 may include the communication module 130 in FIG. 1.

The communication module 720 may include the cellular module 721, a WiFi module 723, a BT module 725, a GPS module 727, an NFC module 728, and a radio frequency (RF) module 729.

The cellular module 721 provides a voice call service, a video call service, a messaging service, or an Internet service over a communication network.

In an embodiment of the present disclosure, the cellular module 721 performs identification and authentication of the electronic device 701 within the communication network using the SIM card 724.

In an embodiment of the present disclosure, the cellular module 721 performs some of the functions that can be provided by the AP 710.

In an embodiment of the present disclosure, the cellular module 721 includes a communication processor (CP).

Each of the WiFi module 723, the BT module 725, the GPS module 727, or the NFC module 728 may include a processor for processing the data transmitted or received through the corresponding module.

In an embodiment of the present disclosure, at least some of the cellular module 721, the WiFi module 723, the BT module 725, the GPS module 727, or the NFC module 728 may be included in one integrated chip (IC) or IC package.

The RF module 729 transmits and receives communication signals (e.g., RF signals). The RF module 729 may include a transceiver, a power amplifier module (PAM), a frequency filter, a low noise amplifier (LNA), or an antenna.

In an embodiment of the present disclosure, at least one of the cellular module 721, the WiFi module 723, the BT module 725, the GPS module 727, or the NFC module 728 may transmit and receive RF signals through a separate RF module.

The SIM card 724 may include a card with a subscriber identification module and/or an embedded SIM. The SIM card 724 includes unique identification information (e.g., integrated circuit card identifier (ICCID)) or subscriber information (e.g., international mobile subscriber identity (IMSI)).

The memory 730 (e.g., the memory 630 or the storage unit 190) may include an internal memory 732 or an external memory 734.

The internal memory 732 may include at least one of a volatile memory (e.g., dynamic RAM (DRAM), static RAM (SRAM), synchronous dynamic RAM (SDRAM), etc.) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash, etc.), hard drive, or solid state drive (SSD)).

The external memory 734 may include a flash drive, for example, compact flash (CF), secure digital (SD), micro secure digital (Micro-SD), mini secure digital (Mini-SD), extreme digital (xD), a memory stick, etc. The external memory 734 may be functionally and/or physically connected to the electronic device 701 through various interfaces.

The sensor module 740 may include the components of the sensor module 150 in FIG. 1. The sensor module 740 measures the physical quantity or detects the operating status of the electronic device 701, and converts the measured or detected information into an electrical signal. The sensor module 740 may include at least one of a gesture sensor 740A, a gyro sensor 740B (e.g., the gyro sensor 152), a barometric pressure sensor 740C, a magnetic sensor 740D, an acceleration sensor 740E (e.g., the acceleration sensor 151), a grip sensor 740F, a proximity sensor 740G, a red-green-blue (RGB) sensor 740H, a biometric sensor 740I, a temperature/humidity sensor 740J, an illuminance sensor 740K, or a ultra violet (UV) sensor 740M. Additionally or alternatively, the sensor module 740 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 740 may further include a control circuit for controlling at least one or more sensors belonging thereto.

In an embodiment of the present disclosure, the electronic device 701 may further include a processor configured to control the sensor module 740, independently of or as a part of the AP 710, thereby to control the sensor module 740 while the AP 710 is in a sleep state.

The input device 750 may include a touch panel 752, a (digital) pen sensor 754, a key 756, or an ultrasonic input device 758.

The touch panel 752 may use at least one of the capacitive, resistive, infrared, or ultrasonic scheme. The touch panel 752 may further include a control circuit. The touch panel 752 may further include a tactile layer, to provide a tactile or haptic feedback to the user.

The (digital) pen sensor 754 may be a part of the touch panel 752, or includes a separate recognition sheet.

The key 756 may include a physical button, an optical key or a keypad.

The ultrasonic input device 758 detects ultrasonic waves generated in an input tool using a microphone 788 in the electronic device 701, to identify the data corresponding to the detected ultrasonic waves.

The display 760 (e.g., the display 660) may include a panel 762, a hologram device 764, or a projector 766.

The panel 762 may be identical or similar in structure to the display 660 in FIG. 6. The panel 762 may be implemented to be flexible, transparent or wearable. The panel 762, together with the touch panel 752, may be implemented as one module.

The hologram device 764 displays stereoscopic images in the air using the interference of the light.

The projector 766 displays images by projecting the light on the screen. The screen may be disposed on the inside or outside of the electronic device 701.

In an embodiment of the present disclosure, the display 760 may further include a control circuit for controlling the panel 762, the hologram device 764, or the projector 766.

The interface 770 may include an HDMI 772, a USB 774, an optical interface 776, or a D-subminiature (D-sub) 778. The interface 770 may be included in the communication interface 670 shown in FIG. 6. Additionally or alternatively, the interface 770 may include a mobile high-definition link (MHL) interface, a secure digital (SD) card/multi-media card (MMC) interface, or an infrared data association (IrDA) interface.

The audio module 780 converts sounds and electrical signals bi-directionally. At least some components of the audio module 780 may be included in the I/O interface 650 shown in FIG. 6. The audio module 780 processes the sound information that is received or output through a speaker 782 (e.g., the speaker 170), a receiver 784, an earphone 786, or the microphone 788.

The camera module 791 captures still images and videos.

In an embodiment of the present disclosure, the camera module 791 includes one or more image sensors (e.g., a front image sensor or a rear image sensor), a lens, an image signal processor (ISP), or a flash (e.g., an LED or xenon lamp).

The power management module 795 manages the power of the electronic device 701.

In an embodiment of the present disclosure, the power management module 795 may include a power management integrated circuit (PMIC), a charger integrated circuit (IC), or a battery gauge. The PMIC may have the wired and/or wireless charging schemes.

The wireless charging scheme may include a magnetic resonance scheme, a magnetic induction scheme, or an electromagnetic scheme, and the power management module 795 may further include additional circuits (e.g., a coil loop, a resonant circuit, a rectifier, etc.) for wireless charging. The battery gauge measures the remaining capacity, charging voltage, charging current, or temperature of the battery 796.

The battery 796 may include a rechargeable battery and/or a solar battery.

The indicator 797 indicates specific status (e.g., boot status, message status, charging status, etc.) of the electronic device 701 or a part (e.g. the AP 710) thereof.

The motor 798 converts an electrical signal into mechanical vibrations to generate a vibration or haptic effect.

The electronic device 701 may include a processing device (e.g., GPU) for mobile TV support. The processing device for mobile TV support processes media data that is based on the standards such as digital multimedia broadcasting (DMB), digital video broadcasting (DVB) or Media-FLO™.

Each of the above-described components of the electronic device may be configured with one or more components, names of which may vary depending on the type of the electronic device.

In various embodiments of the present disclosure, the electronic device includes at least one of the above-described components, some of which may be omitted, or may further include additional other components. Further, some of the components of the electronic device may be configured as one entity by being combined, thereby performing the functions of the individual components in the same manner.

Figure 8:
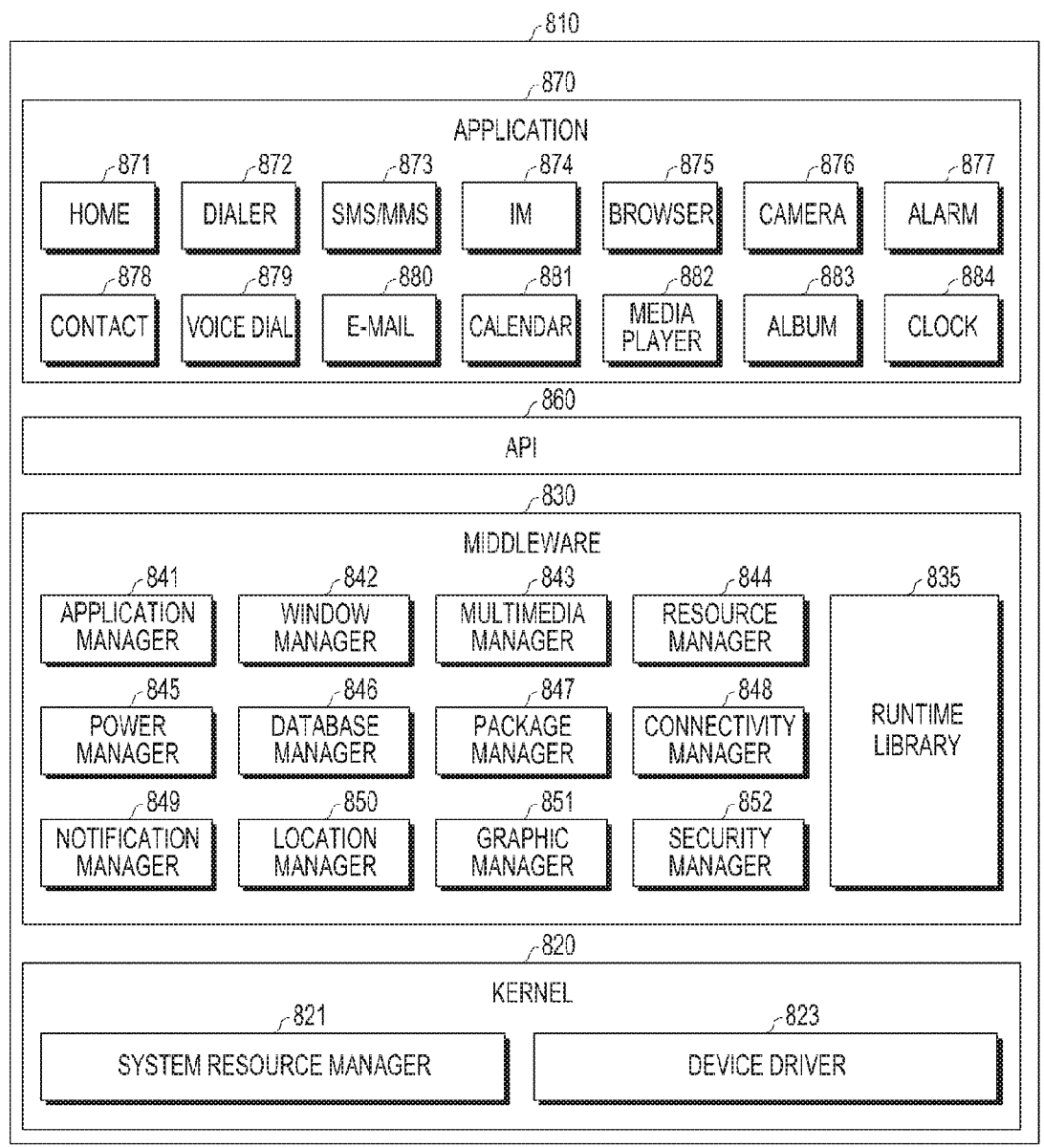
FIG. 8 is a block diagram of a program module, according to an embodiment of the present disclosure.

FIG. 8 is a block diagram of a program module, according to an embodiment of the present disclosure.

In an embodiment of the present disclosure, a program module 810 (e.g., the program 640) includes an operating system (OS) for controlling the resources related to the electronic device 601 (or the electronic device 100), and/or a variety of applications (e.g., the application 647) that run on the operating system. The operating system may be, for example, Android™, iOS™, Windows™, Symbian™, Tizen™, Bada™, etc.

The program module 810 includes a kernel 820, a middleware 830, an application programming interface (API) 860, and/or an application 870. At least a part of the program module 810 may be preloaded on the electronic device 601, or downloaded from the server (e.g., the server 606).

The kernel 820 (e.g., the kernel 641 in FIG. 6) includes a system resource manager 821 and/or a device driver 823.

The system resource manager 821 controls, allocates, or recovers the system resources.

In an embodiment of the present disclosure, the system resource manager 821 includes a process manager, a memory manager, a file system manager, etc.

The device driver 823 may include a display driver, a camera driver, a Bluetooth driver, a shared memory driver, a USB driver, a keypad driver, a WiFi driver, an audio driver, or an inter-process communication (IPC) driver.

The middleware 830 may provide a function that is required in common by the application(s) 870, or may provide various functions to the application 870 through the API 860 so that the application 870 may efficiently use the limited system resources within the electronic device 601.

In an embodiment of the present disclosure, the middleware 830 (e.g., the middleware 643) includes at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, or a security manager 852.

The runtime library 835 is used by a compiler to add a new function through a programming language while the application 870 is executed. The runtime library 835 performs an I/O management function, a memory management function, an arithmetic function, etc.

The application manager 841 manages the life cycle of at least one of the application(s) 870.

The window manager 842 manages graphic user interface (GUI) resources that are used on the screen of the electronic device 601.

The multimedia manager 843 determines the format required for playback of various media files, and encodes or decodes the media files using a codec for the format.

The resource manager 844 manages resources such as a source code, a memory, or a storage space for the application 870.

The power manager 845 manages the battery or power by operating with the basic input/output system (BIOS), and provides power information required for an operation of the electronic device 601.

The database manager 846 creates, searches, and updates the database that is to be used the application 870.

The package manager 847 manages installation or update of applications that are distributed in the form of a package file.

The connectivity manager 848 manages a wireless connection, such as WiFi or Bluetooth.

The notification manager 849 indicates or notifies of events, such as message arrival, appointments and proximity in a manner that doesn't interfere with the user.

The location manager 850 manages the location information of the electronic device 601.

The graphic manager 851 manages the graphic effect to be provided to the user, or the user interface related thereto.

The security manager 852 provides various security functions required for the system security or user authentication.

In an embodiment of the present disclosure, if the electronic device 601 includes a phone function, the middleware 830 may further include a telephony manager for managing the voice or video call function of the electronic device.

The middleware 830 may include a module that forms a combination of various functions of the above-described components 835 to 852. The middleware 830 may provide a module specialized for the type of the operating system in order to provide a differentiated function. Further, the middleware 830 may dynamically remove some of the existing components, or add new components.

The API 860 (e.g., the API 645) is a set of API programming functions, and may be provided in a different configuration depending on the operating system. For example, for Android™ or iOS™, the API 860 may provide one API set per platform, and for Tizen™, the API 860 may provide two or more API sets per platform.

The application 870 (e.g., the application 647) may include one or more applications capable of performing functions such as a home 871, a dialer 872, a short message service/multimedia messaging service (SMS/MMS) 873, an instant message (IM) 874, a browser 875, a camera 876, an alarm 877, a contact 878, a voice dial 879, an Email 880, a calendar 881, a media player 882, an album 883, and a clock 884. Additionally, the application 870 may include a healthcare application (e.g., for measuring the quantity of exercise, blood glucose level, etc.), or an application for providing environmental information (e.g., for providing information about the atmospheric pressure, the humidity, the temperature, etc.).

In an embodiment of the present disclosure, the application 870 may include an information exchange application for supporting information exchange between the electronic device 601 and external electronic devices 602 and 604. The information exchange application may include a notification relay application for delivering specific information to the external electronic devices, or a device management application for managing the external electronic devices.

For example, the notification relay application delivers notification information generated in other applications (e.g., an SMS/MMS application, an Email application, a healthcare application, an environmental information application, etc.) of the electronic device 601, to the external electronic devices 602 and 604. Further, the notification relay application receives notification information from an external electronic device, and provides the received notification information to the user.

The device management application manages at least one function (e.g., a function of adjusting the turn-on/off of the external electronic device itself (or some components thereof) or the brightness (or the resolution) of the display) of the external electronic device 602 and 604 communicating with the electronic device 601, and manages (e.g., installs, deletes, or updates) an application operating in the external electronic device or a service (e.g., a call service or a messaging service) provided in the external electronic device.

In an embodiment of the present disclosure, the application 870 includes an application (e.g., a healthcare application for a mobile medical device) that is specified depending on the properties (i.e., the type of the electronic device) of the external electronic device 602 and 604.

In an embodiment of the present disclosure, the application 870 may include an application received or downloaded from the external electronic device 602, 604, or the server 606.

In an embodiment of the present disclosure, the application 870 may include a preloaded application or a third party application that can be downloaded from the server 606.

The names of the components of the illustrated program module 810 may vary depending on the type of the operating system.

In various embodiments of the present disclosure, at least a part of the program module 810 may be implemented by software, firmware, hardware or a combination thereof. At least a part of the program module 810 may be implemented (e.g., executed) by a processor (e.g., the AP 710). At least a part of the program module 810 may include, for example, a module, a program, a routine, an instruction set, or a process, for performing one or more functions.

The term 'module', as used herein, may refer to a unit that includes, for example, one or a combination of hardware, software or firmware. The term 'module' may be interchangeably used with terms such as unit, logic, logical block, component, or circuit. The 'module' may be the minimum unit of an integrally constructed part, or a part thereof. The 'module' may be the minimum unit for performing one or more functions, or a part thereof. The 'module' may be implemented mechanically or electronically. For example, the 'module' may include at least one of an application-specific integrated circuit (ASIC) chip, field-programmable gate arrays (FPGAs), or a programmable-logic device, which are known or will be developed in the future, and which perform certain operations.

At least a part of the electronic device (e.g., modules or functions thereof) or method (e.g., operations), according to various embodiments of the present disclosure, may be implemented by an instruction that is stored in computer-readable storage media in the form of a program module. If the instruction is executed by at least one processor (e.g., the controller 110 or the processor 620), the at least one processor performs a function corresponding to the instruction. The computer-readable storage media may be the memory 630 or the storage unit 190.

The computer-readable storage media may include magnetic media (e.g., a hard disk, a floppy disk, and magnetic tape), optical media (e.g., a compact disc read only memory (CD-ROM) and a digital versatile disc (DVD)), magneto-optical media (e.g., a floptical disk), and a hardware device (e.g., a read only memory (ROM), a random access memory (RAM) or a flash memory). A program instruction may include, not only a machine code such as a code made by a compiler, but also a high-level language code that can be executed by the computer using an interpreter. The above-described hardware device may be configured to operate as one or more software modules to perform the operations, according to various embodiments of the present disclosure, and vice versa.

A module or a program module, according to various embodiments of the present disclosure, may include at least one of the above-described components, some of which may be omitted, or may further include additional other components. Operations performed by a module, a program module, or other components may be performed in a sequential, parallel, iterative or heuristic way. Some operations may be performed in a different order or omitted, or other operations may be added.

Embodiments disclosed herein have been presented for description and understanding of the technical details, but it is not intended to limit the scope of the present disclosure. Therefore, the scope of the present disclosure should be construed to include all changes or various other embodiments based on the technical spirit of the present disclosure. Therefore, the scope of the present disclosure is defined, not by the detailed description and embodiments, but by the following claims and their equivalents.

What is claimed is:

1. A method of an electronic device for preventing the electronic device from being left in a vehicle, the method comprising:
   identifying at least one of an acceleration value and a rotation angle value of the electronic device using at least one of an acceleration sensor and a gyro sensor, upon receiving, from the vehicle, a first signal including information regarding identification of an off state of an engine of the vehicle;
   determining whether the at least one of the acceleration value and the rotation angle value of the electronic device is changed, upon receiving, from the vehicle, a second signal including information regarding identification of a change to an empty state of at least one seat of the vehicle;
   determining that there is no movement of the electronic device based on a result of determining whether the at least one of the acceleration value and the rotation angle value of the electronic device is changed; and
   executing an alarm function, if it is determined that there is no movement of the electronic device.

2. The method of claim 1, wherein the first signal further includes information regarding identification of an open state of at least one door of the vehicle.

3. The method of claim 2, wherein the second signal further includes information regarding identification of a closed state of the at least one door when the at least one door was previously identified in the open state.

4. The method of claim 3, wherein the identification of the change to the empty state of the at least one seat is performed by identifying a change in a pressure sensor value of the at least one seat.

5. A method of a vehicle for preventing an electronic device from being left in the vehicle, the method comprising:
   identifying an off state of an engine of the vehicle;
   transmitting, to the electronic device, a first signal including information regarding the identification of the off state of the engine;
   identifying a change in a state of at least one seat of the vehicle;
   transmitting, to the electronic device, a second signal including information regarding the identification of the change in the state of the at least one seat; and
   executing an alarm function, upon receiving, from the electronic device, a third signal transmitted based on determining whether at least one of an acceleration value and a rotation angle value of the electronic device is changed,
   wherein the at least one of the acceleration value and the rotation angle value of the electronic device is measured by the electronic device when the electronic device receives the first signal from the vehicle, and
   wherein determining whether the at least one of the acceleration value and the rotation angle value of the electronic device is changed is executed by the electronic device when the electronic device receives the second signal.

6. The method of claim 5, further comprising:
   identifying an open state of at least one door of the vehicle; and
   identifying a closed state of the at least one door when the at least one door was previously in the open state,
   wherein the first signal further includes information regarding the identification of the open state of the at least one door, and wherein the second signal further includes information regarding the identification of the closed state of the at least one door when the at least one door was previously identified in the open state.

7. The method of claim 5, wherein identifying the change in the state of the at least one seat comprises determining that the state of the at least one seat is changed to an empty state, based on a change in pressure sensor value of the at least one seat.

8. An electronic device comprising:
a communication device;
a speaker;
a sensor device configured to detect movement of the electronic device and comprising at least one of an acceleration sensor and a gyro sensor; and
a controller configured to:
identify at least one of an acceleration value and a rotation angle value of the electronic device using the at least one of the acceleration sensor and the gyro sensor, upon receiving, from a vehicle, through the communication device, a first signal including information regarding detection of an off state of an engine of the vehicle,
determine whether the at least one of the acceleration value and the rotation angle value of the electronic device is changed, upon receiving, from the vehicle, through the communication device, a second signal including information regarding detection of a change in a state of at least one seat of the vehicle,
determine that there is no movement of the electronic device, based on a result of determining whether the at least one of the acceleration value and the rotation angle value of the electronic device is changed, and
output an alarm, if it is determined that there is no movement of the electronic device.

9. The electronic device of claim 8, wherein the first signal further includes information regarding detection of an open state of at least one door of the vehicle.

10. The electronic device of claim 9, wherein the second signal further includes information regarding detection of a closed state of the at least one door when the at least one door was previously identified in the open state.

11. The electronic device of claim 10, wherein the detection of the change in the state of the at least one seat is performed by identifying a change in a pressure value of a pressure sensor of the at least one seat.

12. The electronic device of claim 10, wherein the at least one seat includes a driver's seat of the vehicle, and the at least one door includes a driver's door.

13. A vehicle comprising:
a communication device;
an engine switch device configured to turn an engine of the vehicle on or off;
a seat occupancy detection device configured to detect a person sitting in at least one seat of the vehicle; and
a controller configured to:
upon detecting an off state of the engine through the engine switch device, transmit, to an electronic device, through the communication device, a first signal including information regarding the off state of the engine,
upon detecting a change in state of the at least one seat of the vehicle through the seat occupancy detection device, transmit, to the electronic device, through the communication device, a second signal including information regarding the change in the state of the at least one seat, and
upon receiving, from the electronic device, a third signal transmitted based on determining whether at least one of an acceleration value and a rotation angle value of the electronic device is changed, execute an alarm function,
wherein the at least one of the acceleration value and the rotation angle value of the electronic device is measured by the electronic device when the electronic device receives the first signal from the vehicle, and
wherein determining whether the at least one of the acceleration value and the rotation angle value of the electronic device is changed is executed by the electronic device when the electronic device receives the second signal.

14. The vehicle of claim 13, further comprising:
a door open/close detection device configured to detect an open/closed state of at least one door of the vehicle,
wherein the controller is further configured to:
detect an open state of the at least one door of the vehicle, through the door open/close detection device, and
detect a closed state of the at least one door, through the door open/close detection device, when the at least one door was previously detected in the open state,
wherein the first signal further includes information regarding the detection of the open state of the at least one door, and
wherein the second signal further includes information regarding the detection of the closed state of the at least one door when the at least one door was previously detected in the open state.

15. The vehicle of claim 13, wherein the seat occupancy detection device includes a pressure sensor that is provided in the at least one seat of the vehicle to measure a pressure value, and
wherein the controller is further configured to determine that the state of the at least one seat is changed to an empty state, based on a change in the pressure value of the at least one seat.

* * * * *